United States Patent
Ito et al.

[11] Patent Number: 5,803,760
[45] Date of Patent: Sep. 8, 1998

[54] RELEASABLE CONNECTOR

[75] Inventors: Hikaru Ito; Masashi Saito; Eiji Saijo; Shinichi Yamada, all of Yokkaichi, Japan

[73] Assignee: Sumitomo Wiring Systems, Ltd., Japan

[21] Appl. No.: 511,957

[22] Filed: Aug. 7, 1995

[30] Foreign Application Priority Data

Aug. 8, 1994 [JP] Japan .................................. 6-207968

[51] Int. Cl.$^6$ .................................................. H01R 13/62
[52] U.S. Cl. ........................................ 439/310; 439/350
[58] Field of Search ................................ 439/310, 372, 439/481, 482, 483, 700, 824, 350

[56] References Cited

U.S. PATENT DOCUMENTS

| | | | |
|---|---|---|---|
| 3,529,276 | 9/1970 | Hennessey, Jr. | 439/310 |
| 3,723,944 | 3/1973 | Gauchat et al. | 439/372 |
| 5,350,312 | 9/1994 | Kuno et al. | 439/310 |
| 5,529,510 | 6/1996 | Wakata et al. | 439/310 |

FOREIGN PATENT DOCUMENTS

| | | |
|---|---|---|
| 0634818 | 1/1995 | European Pat. Off. . |
| 4343209 | 7/1994 | Germany . |
| 60-24539 | 6/1985 | Japan . |
| 63-285884 | 11/1988 | Japan . |

*Primary Examiner*—Hien Vu
*Attorney, Agent, or Firm*—Jordan B. Bierman; Bierman, Muserlian and Lucas

[57] ABSTRACT

A grip shaft extends substantially longitudinally from the rear of a charge connector and a lever is mounted thereon. The connector is connected to a battery fixture by inserting it therein while holding the grip shaft. The lever moves the connector and fixture toward each other as it is pivoted against the shaft, thereby fully connecting the fixture and connector. Thus, the burden on the wrist of the operator during the connection is reduced, even if the battery fixture is horizontally mounted in a relatively low position.

22 Claims, 7 Drawing Sheets

RELEASABLE CONNECTOR

This Application claims the benefit of the priority of Japanese Application 6-207968, filed Aug. 8, 1994.

The present Invention relates to a charge connector, especially for electric vehicles, but is not limited thereto.

BACKGROUND OF THE INVENTION

For some years now, it has been expected that electric vehicles will be put to practical use. In this event, to charge the battery, a charge connector will be required. Such a charge connector is to be connected to the battery of the vehicle and a charger. A satisfactory charge connector must have excellent operability and ensure a safe charging operation despite the relatively large amount of current to be used.

Considering the practicality of connecting the vehicle battery to the charger, the height and the direction of the vehicle-side battery fixture connector are critical. Although there are no adopted standards at this time, it is desirable that the connecting interface of the battery extend at least in the vertical direction to prevent the entry of dripping water during the charging operation. It is also expected that battery fixture will be mounted at waist height of a normal adult person, similar to gas tank openings of presently used gasoline powered vehicles.

In the case in which the fixture is so mounted, the operability of "gun type" connector would be unsatisfactory if it had a downward extending grip, similar to the nozzle on a gasoline hose as is presently used. With a gun type charge connector, the driver needs to hold the grip of the charge connector below the level of the fixture. Thus, the driver has to bend his wrist at a greater angle, thereby exerting substantial pressure thereon.

In terms of safety, it is necessary, for example, to make it impossible for the connector to be detached from the fixture until the charging circuit has been broken, even after the completion of the charging operation. If the connector is detached while the charging circuit is intact, a fine spark may be generated between terminals when they are separated. This causes oxidation and deterioration.

SUMMARY OF THE INVENTION

The present Invention was developed in view of the above problems, and the object thereof is to provide a charge connector for electric vehicles which is easy and safe to operate. While the Invention will be described in terms of a charge connector, it is understood that it is useful with any mating connector. The charge connector according to the present Invention has a substantially longitudinal shaft which is gripped by the user. A securing device comprises a locking lever is mounted on the shaft and is pivotable between a closed position, wherein it rests against the shaft, and an open position, wherein it projects outwardly from the shaft. As the lever is moved from the open position to the closed position, it draws the front interface of the charge connector and the battery fixture toward each other until they are solidly connected. Accordingly, the operator does not need to strain to bend his or her wrist at a sharp angle, even if the battery fixture is horizontally mounted at a relatively low position.

Preferably, the connector is provided with a locking device which retains the lever in its closed position. As a result, the connector and the battery terminal remain fully connected even if the operator does not grip the lever during the charging operation. Thus, displacement during charging is prevented and the burden on the operator is reduced. It is further preferred that the charge connector also comprise a switch which opens and closes the charging circuit which supplies current to the battery. In addition to the usual on and off positions, the switch is provided with a return position, next to the off position, which permits the release of the locking device. Accordingly, the switch is moved from its on position to its off position after the completion of the charging operation. Thereafter, the switch is moved from its off position to its return position, thus releasing the locking device, thereby enabling separation of the connector and the fixture.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
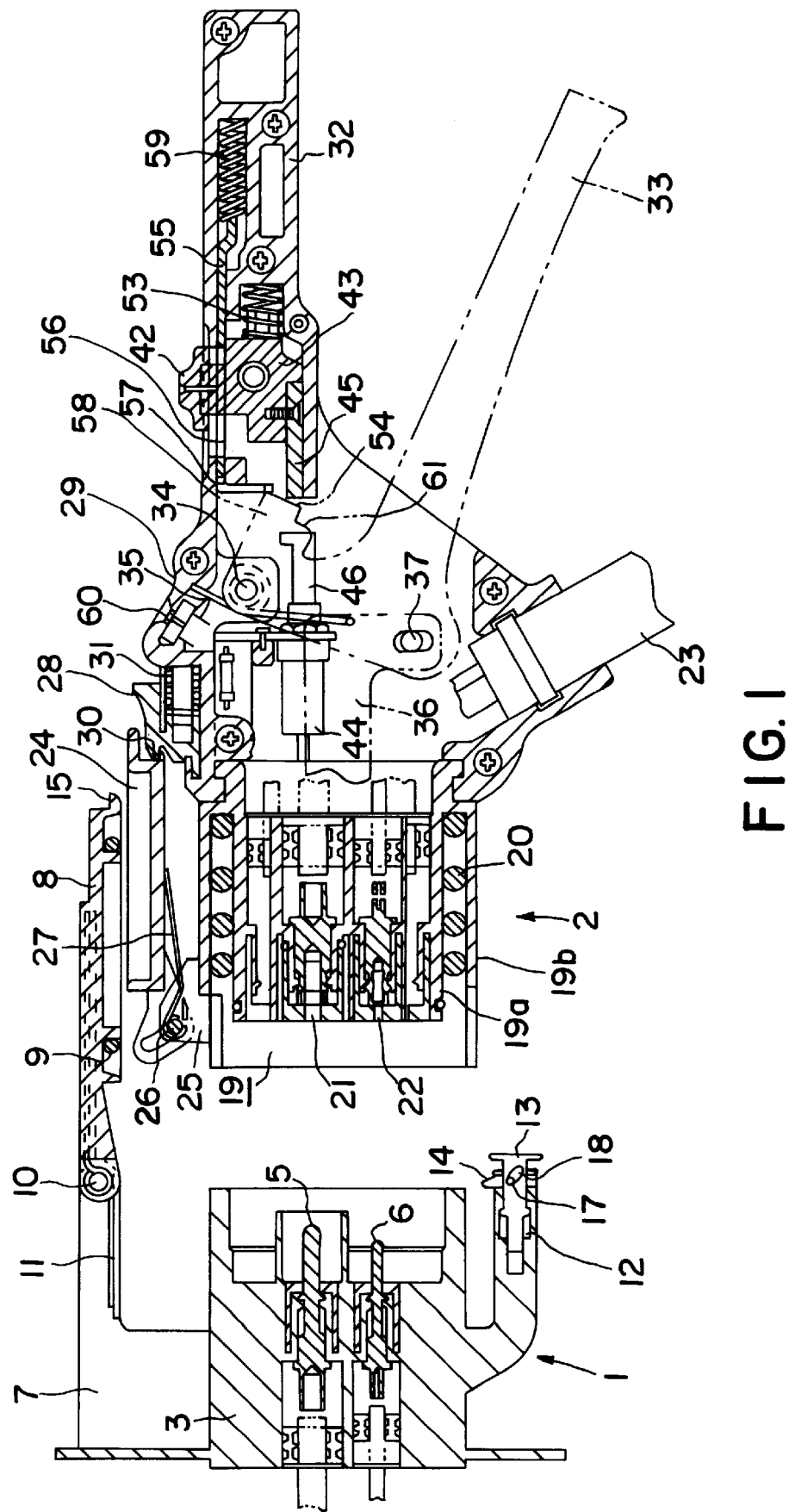
FIG. 1 is a vertical section of a charge connector before the connection thereof to the battery fixture.

Charge connector 2 is connectable with battery fitting 1. Fitting 1 comprises charge terminal 5 connected to battery 4, and signal terminal 6 in cylindrical housing 3. Spring biased lid 8 is mounted on the upper surface of housing 3 via bracket 7. Lid 8 opens and closes the opening in housing 3, and seals its opening by means of seal ring 9 mounted on the inner surface thereof. Torsion spring 11 is externally mounted on shaft 10 and biases lid 8 toward the open position. Although not shown in detail, lid 8 is provided with a stop for restricting the open position to an angular position normal to housing 3.

A locking mechanism for holding lid 8 in its closed position is provided below housing 3. The locking mechanism includes operation shaft 13 with built-in return spring 12 mounted in the lower part of housing 3 so that it extends horizontally and can be pressed into a guide hole. Stop shaft 14 is mounted transversely to operation shaft 13 at right angles. Stop shaft 14 is engageable with and disengageable from claw 15 of lid 8. Although not shown in detail, stop shaft 14 is fitted in a groove (not shown) formed in operation shaft 13 so that it extends in the vertical direction. Further, projection 17 formed on the outer surface of stop shaft 14 engages cam groove 18 which is a through hole in operation shaft 13. Stop shaft 14 is moved upward and downward while being guided by cam groove 18 when operation shaft 13 is pressed into and pulled out of the guide hole.

The charge connector includes housing 19 which is a double-walled cylindrical structure having inner and outer housings 19a and 19b. Helical spring 20 is mounted between housings 19a and 19b so that it can be brought into contact with an opening edge of battery fitting 1. Spring 20 assists in detaching battery fitting 1 from connector 2. Terminals 21 and 22 correspond to charge terminal 5 and the signal terminal 6 of battery fitting 1, respectively, and are mounted in inner housing 19a. Terminals 21 and 22 are connected with a power source of the charger via cable 23.

On the upper surface of outer housing 19b, there is mounted spring biased lid 24 for opening and closing the opening in housing 19. More specifically, lid 24 is pivoted about support pin 26 carried by bearing 25 on the upper surface of outer housing 19b. Torsion spring 27 is externally mounted on support pin 26 to bias lid 24 toward its closed position. Lock member 28 for holding lid 24 in its open position is mounted on the upper surface of main body 29 which is behind and continuous with housing 19. The leading end of lock member 28 engages and disengages engaging edge 30 on lid 24. Lock member 28 is mounted on main body 29 and is slidable forward and backward. Further, lock member 28 is biased toward the locked position of lid 24 by spring 31 mounted therebehind.

Figure 5A:
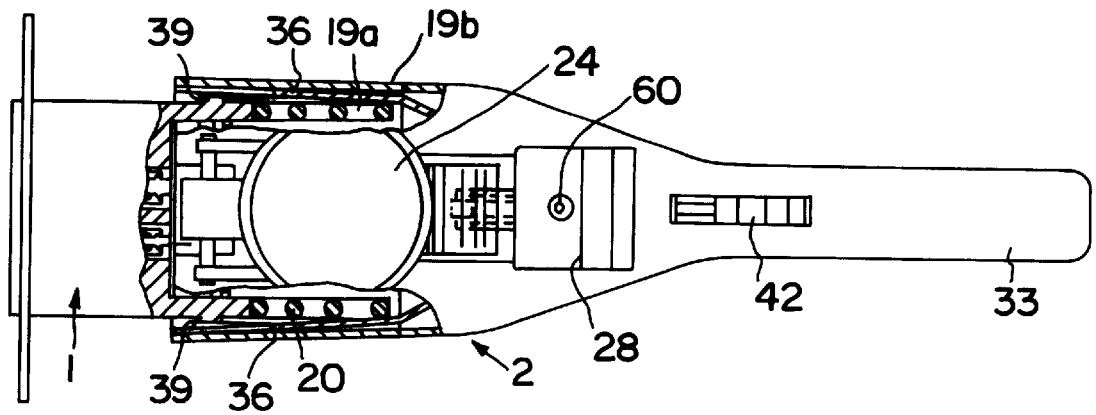
FIGS. 5(A), 5(B), 5(C) are plan views, partially in section, showing the charge connector when first inserted, the contractive deformation of the plates, and their position after locking in, respectively.
Figure 5B:
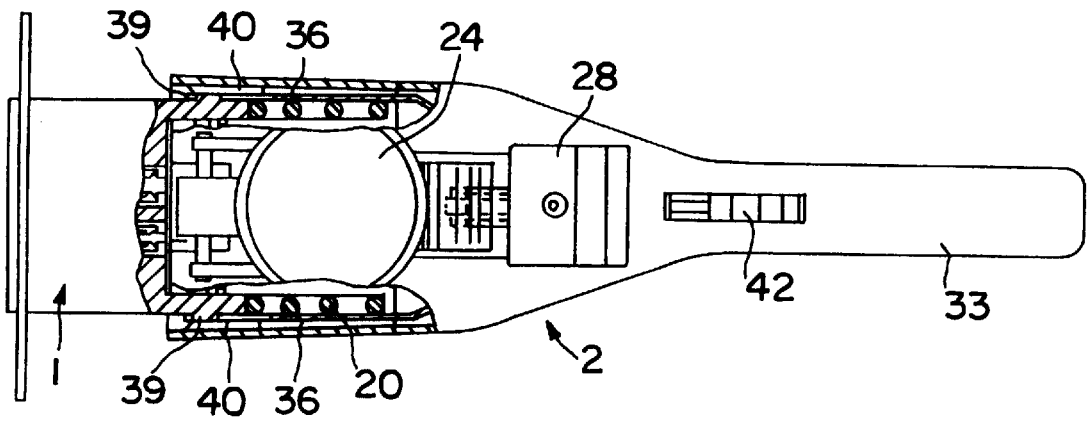
Figure 5C:
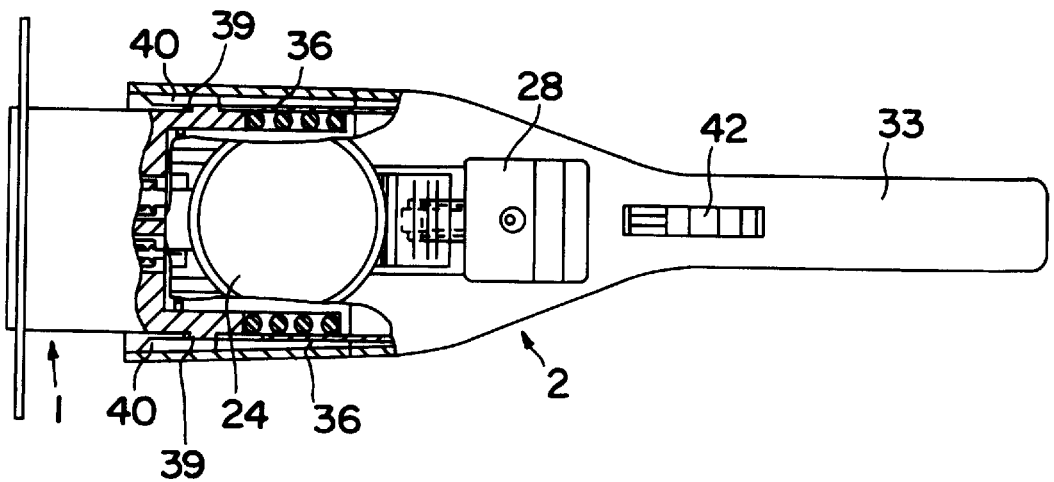
Figure 7A:
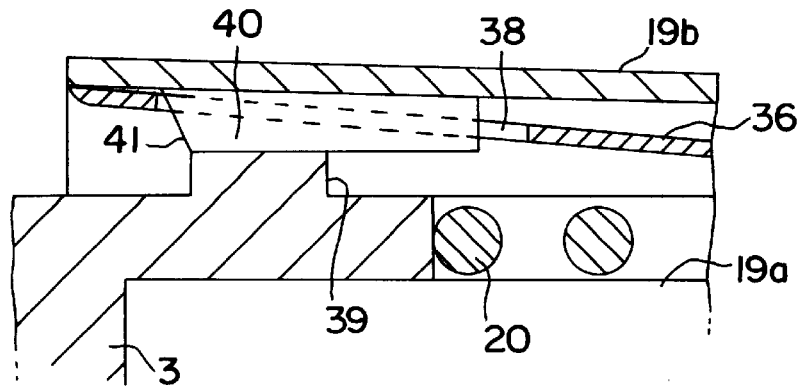
FIG. 7(A) & 7(B) are enlarged horizontal sections of one of the guide recesses and its surrounding elements in the open position and when the plate is contractively deformed, respectively.
Figure 7B:
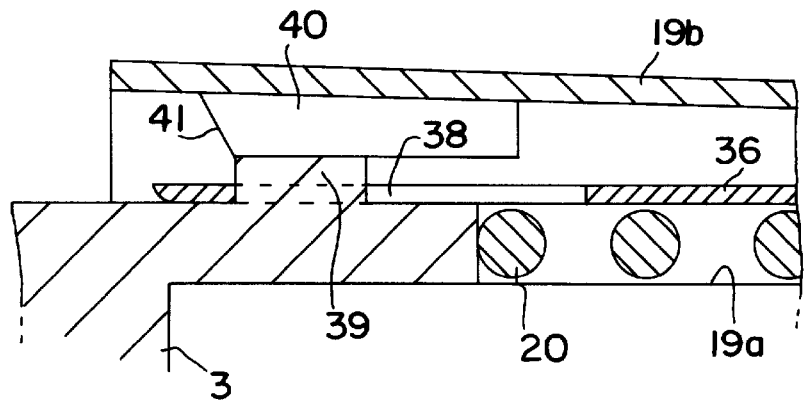

Grip shaft 32 extends in the longitudinal direction backward from main body 29. Lever 33 for facilitating the connection of battery fitting 1 and connector 2 is pivoted about lever shaft 34 at the base of grip shaft 32. Torsion spring 35 is externally mounted on lever shaft 34 to bias lever 33 away from grip shaft 32. A pair of locking plates 36 are connected with lever 33. Specifically, lever 33 is bent into a substantially L-shaped form, and is connected with plates 36 via connecting pin 37. At least one, and preferably two, plates 36 is inserted into lateral side portions of the space between outer and inner housings 19a and 19b particularly as shown in FIGS. 5(A) to 5(C). At the leading ends of plates 36 are oblong holes 38 which are engageable with a pair of projections 39 on the outer surface of housing 3 (see FIGS. 7(A) and 7(B)). In order to avoid the interference of plates 36 and projections 39 during the connection of battery fitting 1 and connector 2, plates 36 are biased so that their leading ends are normally wide open as shown in FIG. 5(A), and guide projections 40 on the inner surface of outer housing 19b fit into the respective holes 38 (see FIG. 7(A)).

However, when lever 33 is gripped and pivoted into its locked position, the opening edges at the leading ends of holes 38 are forced to deform in a contracting (radially inward) direction by slanted surfaces 41 at the leading ends of guide recesses 40 and plates 36 move backward accordingly. As a result, plates 36 come into close contact with the outer surfaces of battery fitting 1 and battery fitting 1 and connector 2 are thereby securely locked together.

Figure 3:
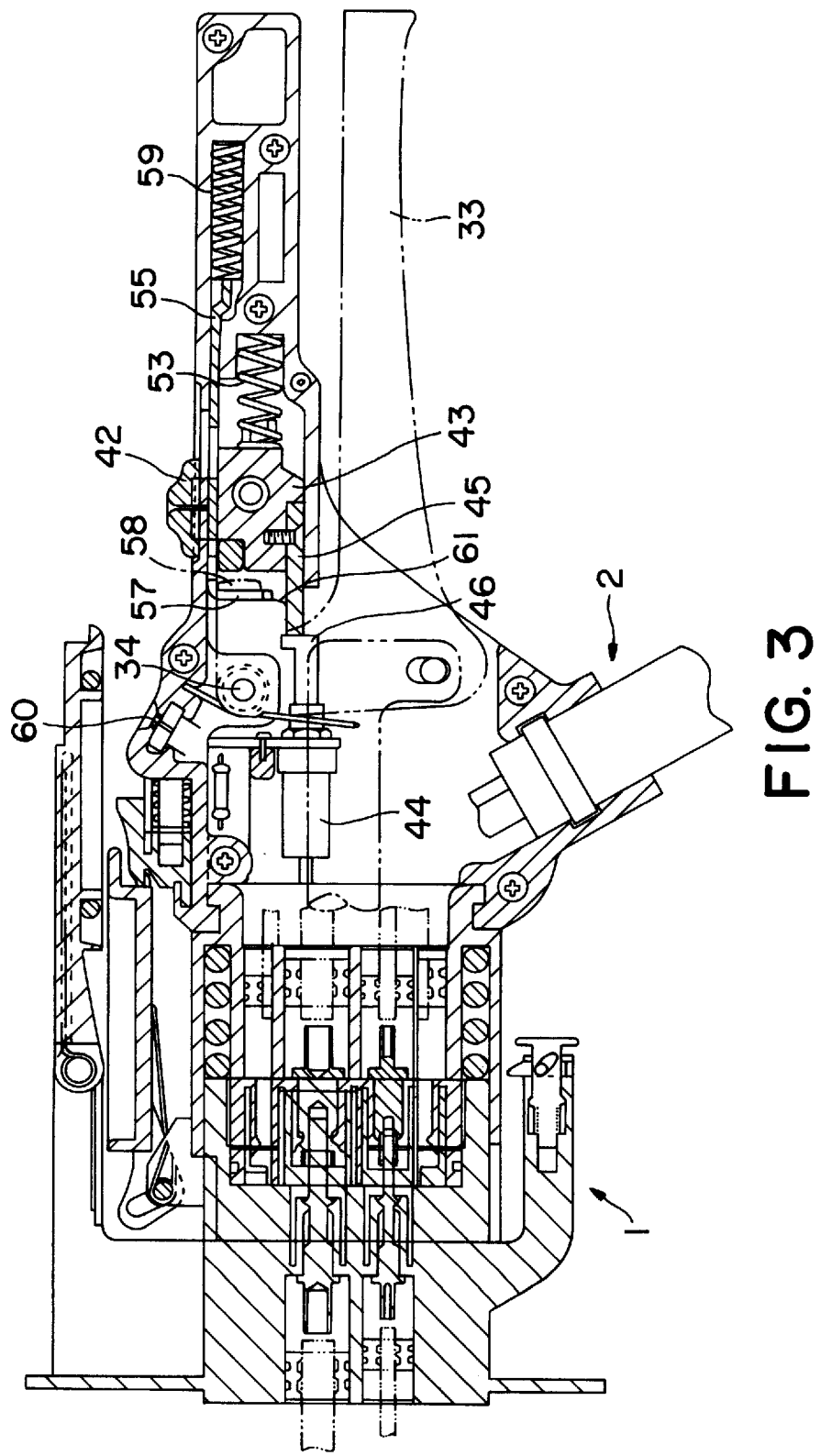
FIG. 3 is a view, similar to that of FIG. 2, showing the switch in the on position.
Figure 8:
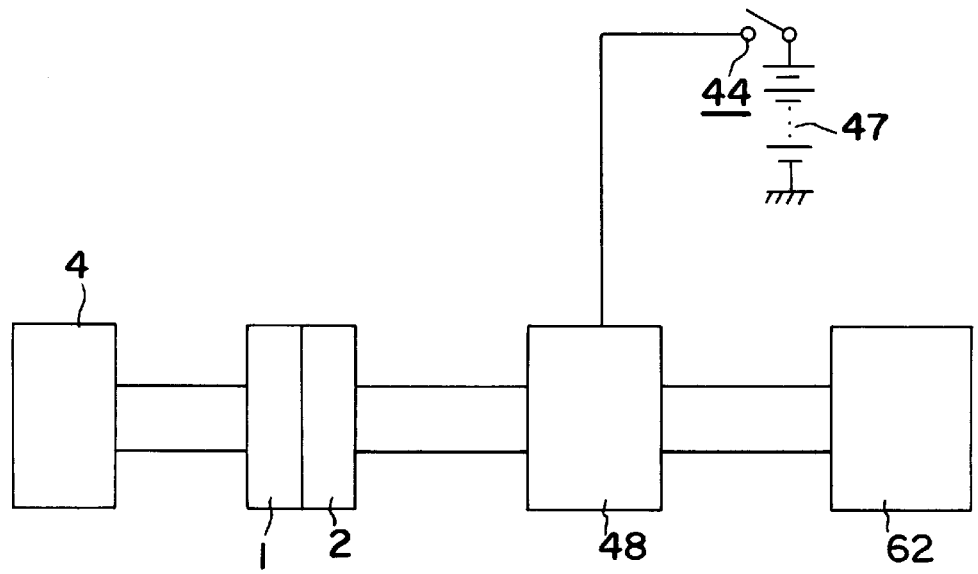
FIG. 8 is a circuit diagram of the charging circuit.

On the upper surface of grip shaft 32, there is provided slide switch 42 for opening and closing the charging circuit as shown in FIG. 8. Slide switch 42 includes sliding member 43 inside grip shaft 32, and pressing plate 45 on the lower surface of sliding member 43 for actuation of micro-switch 44. When slide switch 42 is moved to its on position (as shown in FIGS. 3 and 6(B)), pressing plate 45 presses contact 46 of micro-switch 44.

As shown in FIG. 8, there is provided charging controller 48 (e.g. a relay circuit) between the charge connector 2 and power source 47 for controlling the opening and closing of the charging circuit. When slide switch 42 is moved to its on position and turns micro-switch 44 on, micro-switch 44 outputs a signal in response to which the charging circuit closes and connects control 48 with power source 47. Application of a charging current from charger power source 62 is permitted only when micro-switch 44 is closed (on). Conversely, when micro-switch 44 is open (off), application of power to the charging circuit is prevented.

Figure 2:
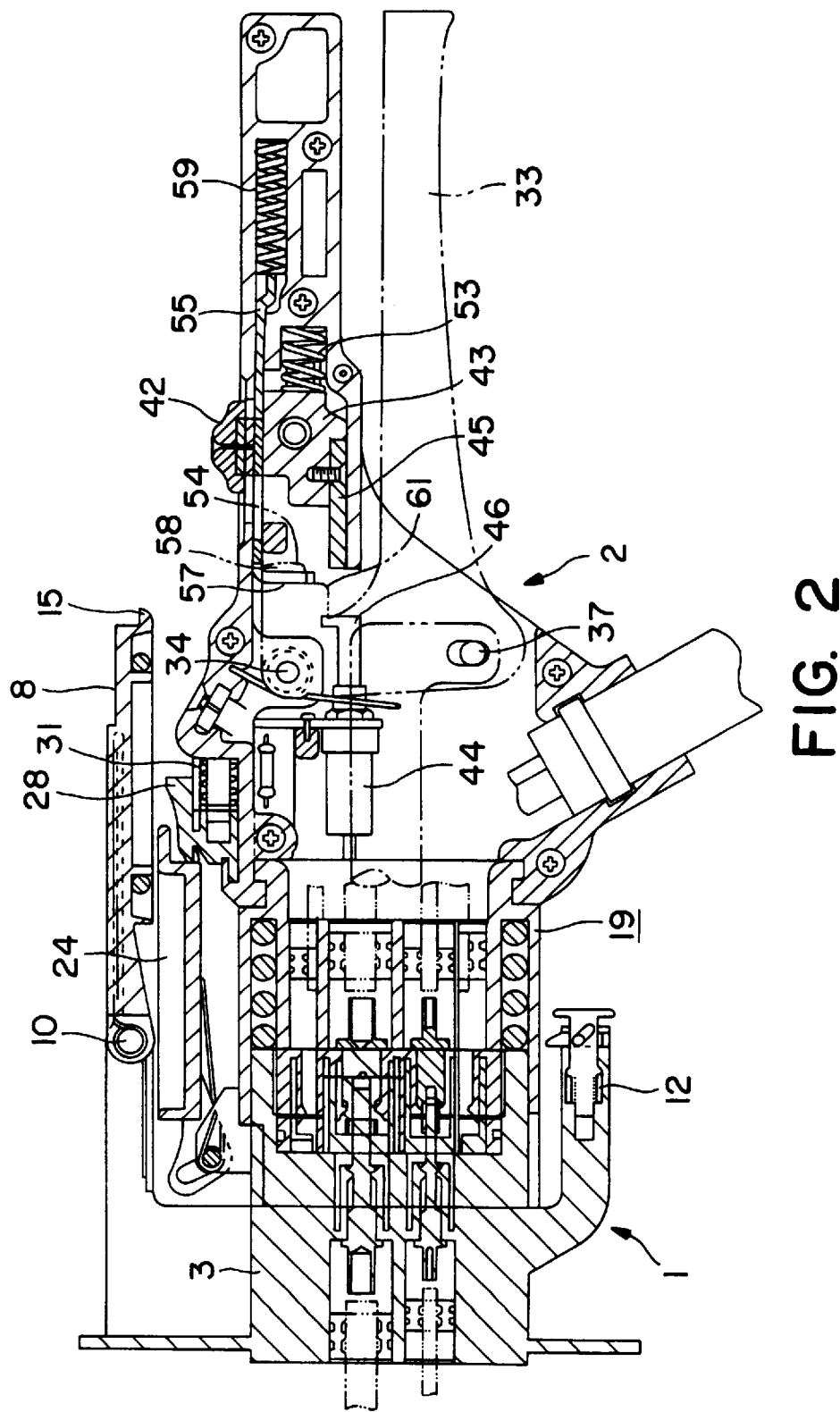
FIG. 2 is a vertical section of the charge connector and battery fixture in the fully mated position.
Figure 4:
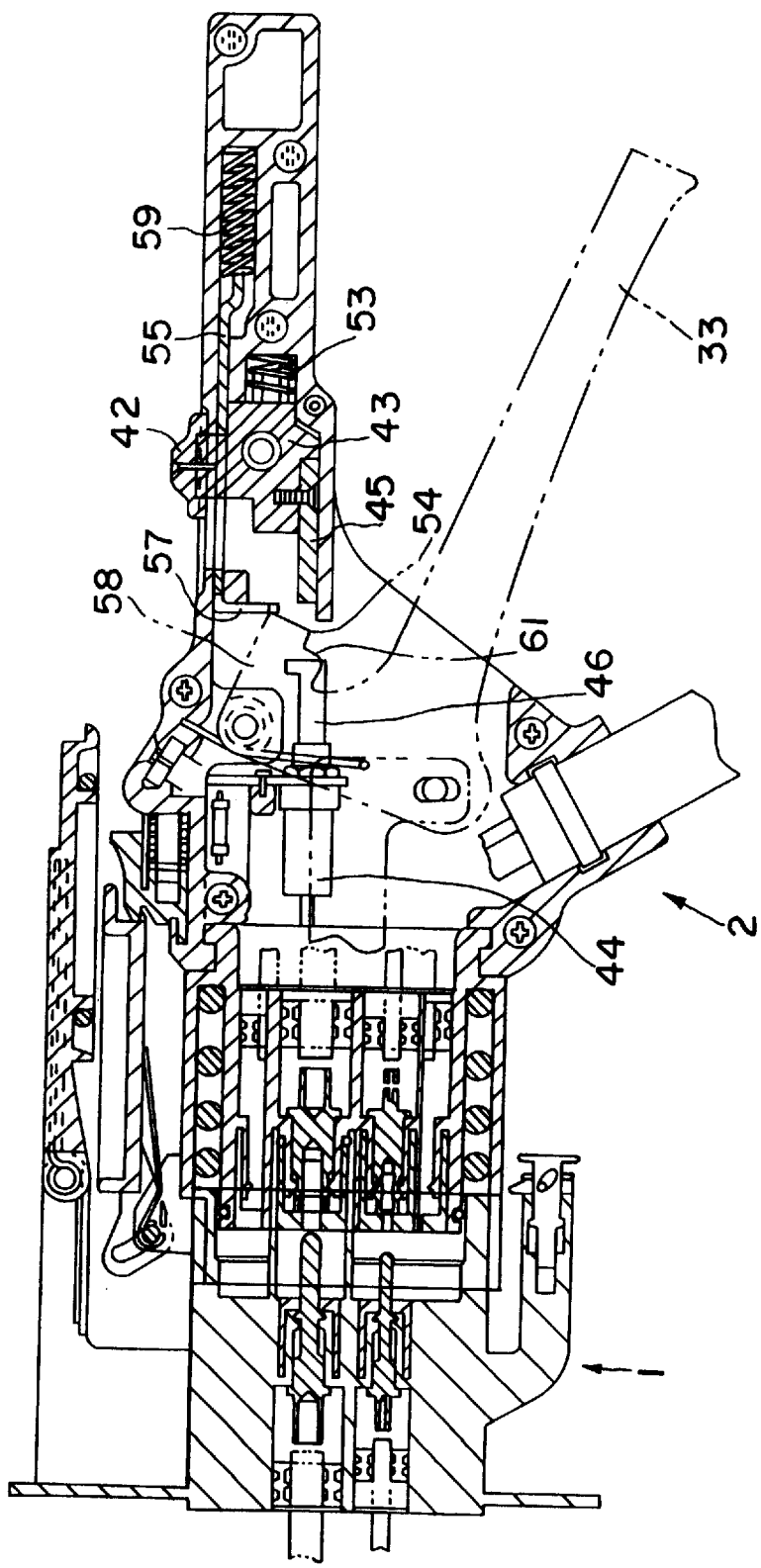
FIG. 4 is a view, similar to that of FIG. 3, showing the switch in the return position.
Figure 6A:
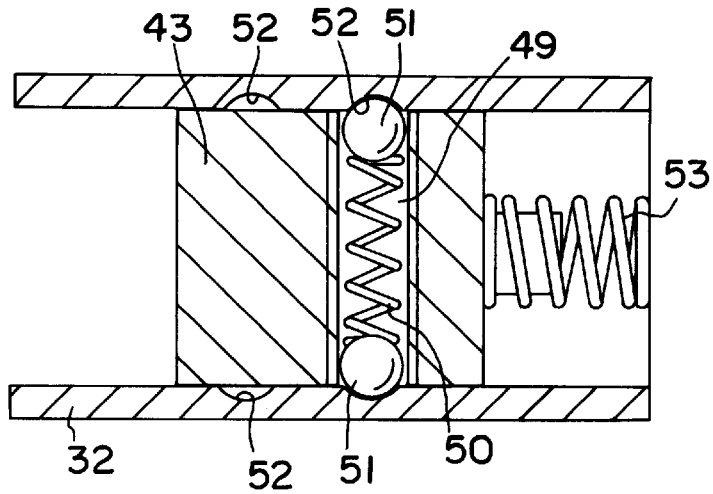
FIGS. 6(A), 6(B), & 6(C) are horizontal sections of the switch in the off position, on position, and return position, respectively.
Figure 6B:
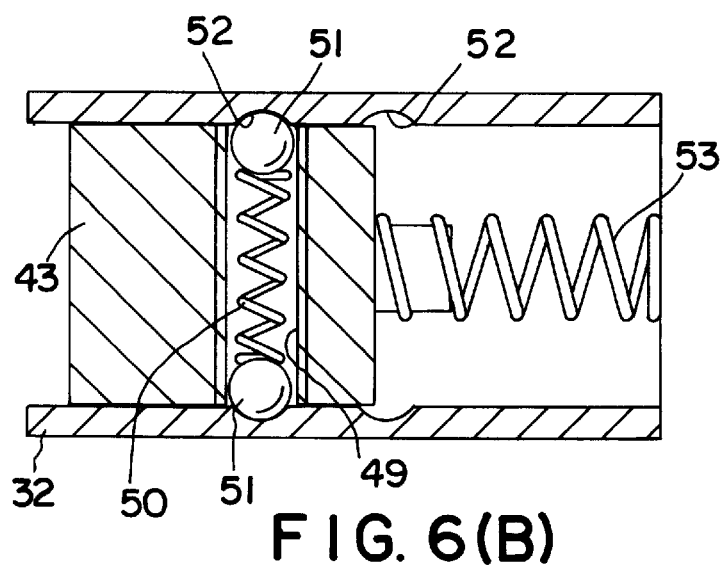
Figure 6C:
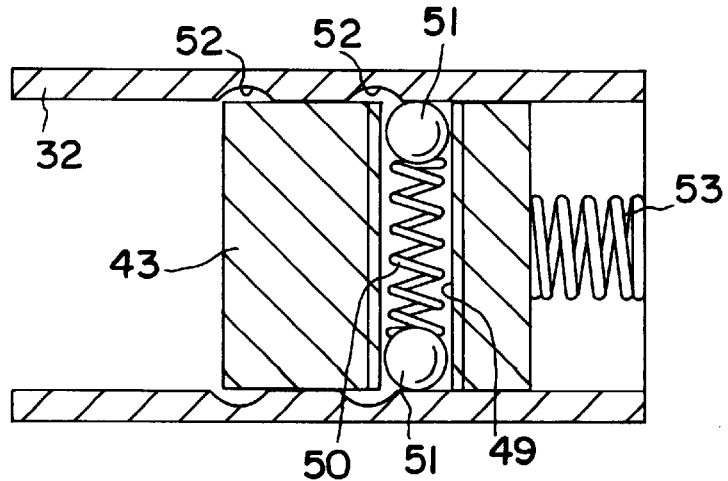

Slide switch 42 has three positions: on (FIG. 6(B)), off (see FIGS. 1, 2 and 6(A)) and return (see FIGS. 4 and 6(C)). As shown in FIGS. 6(A) to 6(C), through hole 49 extends radially in sliding member 43 of slide switch 42. Spring 50 is mounted in through hole 49, and balls 51, held at the opposite ends of spring 50, are pressed against the inner walls of grip shaft 32. Pairs of recesses 52 in the inner wall of grip shaft 32 correspond to the on and off positions of slide switch 42. Balls 51 stay in corresponding recesses 52 to hold slide switch 42 in either its on or off position. Spring 53 is mounted at the rear end of sliding member 43 and urges slide switch 42 from its return position to its off position. The engaging force of balls 51 in recesses 52 is sufficiently large so that slide switch 42 is not moved from its off position to its on position only by spring 53. However, when an operator exerts a pressing force of a specified level or larger, balls 51 and recesses 52 are disengaged.

Slide switch 42 cannot be moved to its on position unless fixture 1 and connector 2 are fully connected. More specifically, at the end of lever 33, stop surface 54 is in contact with pressing plate 45 to prevent slide switch 42 from moving to its on position until lever 33 is pivoted to its locked or closed position.

Lever lock plate 55 for locking lever 33 is mounted in grip shaft 32. Plate 55, in its upper surface, is provided with hole 56 to avoid interference with sliding member 43. The leading end of plate 55 is bent downward and carries hole 57 for retaining a portion of lever 33 inserted therein. The portion of lever 33 below first stop surface 54 is cut out to form a stepped portion. The portion of lever 33 where first stop surface 54 is formed is portion 58 which is inserted into retention hole 57 when lever 33 is in its locked position. Below inserting portion 58 is second stop surface 61 which prohibits the forward movement of pressing plate 45 unless lever 33 is in its locked position. The rear end of plate 55 is urged by spring 59, and plate 55 is biased in the forward direction. However, as shown in FIG. 1, plate 55 is normally in contact with first stop surface 54 and thus the forward movement thereof is prevented. When lever 33 is locked, first stop surface 54 faces retention hole 57 and inserting portion 58 enters hole 57, thereby locking lever 33. Lamp 60 lights when the charging circuit is turned on.

In operation, when shaft 13 of battery fixture 1 is pressed, projection 17 is displaced along cam groove 18, thereby lowering stop shaft 14 which is then disengaged from claw 15. This permits lid 8 to pivot up under the influence of torsion spring 11. Lid 24 of charge connector 2 is pivoted upward to its open position against the force of torsion spring 27, and is held in its open position by lock member 28 and engaging edge 30.

Next, shaft 32 is gripped to bring charge connector 2 to a position where inner housing 19a faces the opening of housing 3, and charge connector 2 is pressed therein by a desired distance (the partially connected state). In the partially connected state, charge connector 2 is partially retained by the engagement of complementary recesses and projections which are not shown. At this stage, since the leading ends of plates 36 are wide open as shown in FIG. 5(A), they do not interfere with projections 39 of battery fixture 1.

Thereafter, as lever 33 is gripped and pivoted to move plates 36 backward, the opening edges of holes 38 slide into contact with slanted surfaces 41 of guide projections 40.

This causes plates 36 to deform in the contracting direction so that holes 38 fit over projections 39. Plates 36 are moved further backward as lever 33 is further pivoted which pulls charge connector 2 further into battery fixture 1, thereby bringing battery fixture 1 and connector 2 into the fully connected state wherein the terminals are properly engaged with each other.

Until the fully connected state is reached, slide switch 42 cannot be moved to its on position, since balls 51 are in recesses 52 and pressing plate 45 is in contact with first stop surface 54 as shown in FIG. 1. This prevents the power application from being mistakenly started before complete connection. Similarly, the forward movement of lock plate 55 is blocked by first stop surface 54 which is in contact with the leading end of lock plate 55.

When the fully connected state is reached, inserting portion 58 of lever 33 faces retention hole 57 of plate 55. Accordingly, plate 55 is now moved forward by spring 59, and inserting portion 58 enters retention hole 57 as shown in FIG. 2. As a result, lever 33 is locked in its closed position, and the operator need no longer grip lever 33 during the charging operation.

At the same time, second stop surface 61 is displaced to the position in which it permits forward movement of pressing plate 45. However, balls 51 continue to hold slide switch 42 in the off position. If the operator exerts a forward force on slide switch 42 at this point, it will move slide switch 42 from the off position to the on position. Thus, balls 51 are fitted and retained in recesses 52 corresponding to the on position of slide switch 42 and plate 45 presses against contact 46 of micro-switch 44, thereby causing charging controller 48 to close the charging circuit and apply power to battery 4.

As can be seen from the foregoing, the charging operation can be safely conducted since the application of power is possible only after the terminals of fixture 1 and connector 2 are fully connected. Further, since the terminals cannot be displaced while the power is being applied, no spark is generated and the terminals are protected. Furthermore, as lamp 60 is on during this time, the operator can easily confirm that the charging operation is in progress.

Upon the completion of the charging operation, slide switch 42 is moved backward to its off position, thereby retracting pressing plate 45 from micro-switch 44 to stop the power application to the charging circuit. Thereafter, lock plate 55 is moved backward against spring 59 by moving slide switch 42 backward to its return position wherein inserting portion 58 comes out of retention hole 57, and lever 33 automatically returns to its initial open position due to the force of torsion spring 35. Thus, plates 36 are moved forward as a result of lever 33 being in its open position, they are disengaged from projections 39 and return to their initial wide open positions. Charge connector 2 can be disengaged from battery fixture 1 to complete the withdrawal.

A variety of changes and modifications can be made in the Invention without departing from the inventive concept thereof. Although the stop surfaces are formed on lever 33 as described above, they may be formed in other positions, or other means be provided to accomplish the same purpose. In other words, any elements may be used in any positions so long as they normally prohibit the movement of slide switch 42 to its on position and permit such a movement upon detecting that fixture 1 and connector 2 are fully connected.

While only a limited number of embodiments of the Invention have been specifically described, it is, nonetheless, to be broadly construed and not to be limited except by the character of the claims appended hereto.

What we claim is:

1. A connector adapted for releasable electrical connection to a mating fixture, said connector comprising:
   a front interface having a power terminal adapted for connection to said mating fixture;
   a generally cylindrical grip shaft extending from said interface longitudinally away from said mating fixture;
   a securing device comprising a lever mounted on said connector and pivotable about a pivot point between an open position, pivoted away from said grip shaft, and a closed position, adjacent said grip shaft, when said lever is moved from said open position to said closed position, said connector and said fixture are drawn together thereby into a fully mated position;
   a charging controller which opens and closes a circuit being actuatable only when said lever is in said closed position, said charging controller comprising a slide switch, actuated by an operator, and a micro-switch, actuated by said slide switch.

2. The connector of claim 1 wherein said securing device comprises at least one actuating plate adapted to engage said fixture and connected to said lever at a location spaced apart from said pivot point, whereby movement of said lever from said open position to said closed position causes said connector and said fixture to be drawn together into said mated position.

3. The connector of claim 2 wherein movement of said lever from said closed position to said open position permits said connector and said fixture to move away from each other.

4. The connector of claim 2 wherein said connector has an inner surface and said fixture has an outer surface, said inner surface adapted to surround said outer surface when said connector is in said mated position, said actuating plate being slidable toward and away from said interface along said inner surface and engaging said outer surface as said lever is moved from said open position to said closed position.

5. The connector of claim 4 wherein said actuating plate disengages from said outer surface as said lever is moved from said closed position to said open position.

6. The connector of claim 2 wherein said actuating plate has an engaging hole therein, said outer surface carries a projection thereon, said projection entering said engaging hole as said lever moves from said open position to said closed position.

7. The connector of claim 2 wherein there is a plurality of said actuating plates, spaced circumferentially around said inner surface.

8. The connector of claim 7 wherein there are two said actuating plates located circumferentially opposite each other.

9. The connector of claim 1 wherein said terminal is connected to a source of electric current at a base remote from said interface and said fixture is adapted to receive said current.

10. The connector of claim 1 wherein said lever is mounted on said gripping shaft.

11. The connector of claim 1 further comprising a locking device for securing said lever in said closed position.

12. The connector of claim 11 wherein said locking device comprises a locking plate, having a retention hole therein, and an inserting portion movable with said lever; when said lever is in said closed position, said inserting portion is in said retention hole, thereby locking said lever in said closed position.

13. The connector of claim 12 wherein said locking plate is biased toward said inserting portion, whereby said retaining hole engages said inserting portion when said lever is in said closed position.

14. The connector of claim 11 comprising a control which opens and closes a circuit.

15. The connector of claim 1 wherein said charging controller comprises, a stop surface between said slide switch and said micro-switch and permitting actuation of said micro-switch when said lever is in said closed position, and preventing actuation of said micro-switch when said lever is not in said closed position.

16. The connector of claim 15 wherein there is a presser plate between said slide switch and said micro-switch adapted to move toward and away from said micro-switch and actuated by said slide switch.

17. The connector of claim 15 comprising a locking device for securing said lever in said closed position, said device comprising a locking plate having a retention hole therein, an inserting portion movable with said lever, said inserting portion being in said retention hole when said lever is in said closed position, a presser plate between said slide switch and said micro-switch and movable by said slide switch between an on position, wherein said micro-switch is actuated, and an off position, wherein said micro-switch is not actuated.

18. The connector of claim 17 wherein said presser and said locking plate are unitary.

19. The connector of claim 17 wherein said stop surface and said inserting portion are on one side of said pivot point.

20. The connector of claim 17 wherein said slide switch has a release position in which said micro-switch is open, said locking device is released, and said lever may be pivoted to said open position.

21. The connector of claim 20 wherein said on position is nearest said micro-switch, said release position is furthest from said micro-switch, and said off position is between said on position and said release position.

22. The connector of claim 1 wherein there is a battery fitting between said front interface and said grip shaft, said battery fitting having a longitudinal axis, said grip shaft having a shaft axis parallel to or coincident with said longitudinal axis.

* * * * *